US010120455B2

United States Patent
Wu (10) Patent No.: US 10,120,455 B2
(45) Date of Patent: Nov. 6, 2018

(54) CONTROL DEVICE AND CONTROL METHOD

(71) Applicant: INDUSTRIAL TECHNOLOGY RESEARCH INSTITUTE, Hsinchu (TW)

(72) Inventor: Chi-Kang Wu, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 15/392,990

(22) Filed: Dec. 28, 2016

(65) Prior Publication Data

US 2018/0181206 A1 Jun. 28, 2018

(51) Int. Cl.
| G09G 5/00 | (2006.01) |
| G06F 3/01 | (2006.01) |
| G01B 21/22 | (2006.01) |
| G01B 11/26 | (2006.01) |
| G06F 3/0346 | (2013.01) |
| G06F 3/03 | (2006.01) |
| G01P 15/00 | (2006.01) |

(52) U.S. Cl.
CPC .............. G06F 3/017 (2013.01); G01B 11/26 (2013.01); G01B 21/22 (2013.01); G06F 3/0304 (2013.01); G06F 3/0346 (2013.01); G01P 15/00 (2013.01)

(58) Field of Classification Search
CPC ...... G06F 3/017; G06F 3/0304; G06F 3/0346; G01B 11/26; G01B 21/22; G01P 15/00; A61B 5/11; A61B 5/1121
See application file for complete search history.

(56) References Cited

U.S. PATENT DOCUMENTS 6,072,467 A * 6/2000 Walker .................... A63F 13/06
340/4.11
6,798,501 B1 * 9/2004 Mizuno ............... B24B 13/0055
356/124

(Continued)

FOREIGN PATENT DOCUMENTS

| CA | 2 907 402 A1 | 9/2014 |
| CN | 102356555 A | 2/2012 |

(Continued)

OTHER PUBLICATIONS

Beck, T. W., et al., "Mechanomyographic amplitude and frequency responses during dynamic muscle actions: a comprehensive review", BioMedical Engineering OnLine, vol. 4, Issue 67, Dec. 19, 2005, pp. 1-27.

(Continued)

Primary Examiner — Joe H Cheng
(74) Attorney, Agent, or Firm — Maschoff Brennan (57) ABSTRACT

A control device includes a main body, a sensing module and a processing module. The sensing module is disposed on the main body. The main body is defined with a device reference axis. The sensing module is configured to detect angle information and strength information. The angle information is corresponding to the angle between the device reference axis and a base reference axis. The strength information is corresponding to a force applied to the main body. The processing module is configured to provide a control signal according to the angle information and the strength information.

12 Claims, 10 Drawing Sheets (56) References Cited

U.S. PATENT DOCUMENTS

| | | | |
|---|---|---|---|
| 7,425,829 B2* | 9/2008 | Zeller | E21B 47/02224 324/326 |
| 7,811,333 B2 | 10/2010 | Jonsson et al. | |
| 7,983,872 B2 | 7/2011 | Makino et al. | |
| 8,732,822 B2 | 5/2014 | Schechter et al. | |
| 9,032,337 B2 | 5/2015 | Oh et al. | |
| 9,032,510 B2 | 5/2015 | Sampathkumaran et al. | |
| 9,207,771 B2 | 12/2015 | Antoniac | |
| 2010/0162182 A1 | 6/2010 | Oh et al. | |
| 2010/0171695 A1* | 7/2010 | Yamamoto | G06F 3/0346 345/157 |
| 2012/0004578 A1 | 1/2012 | Wu et al. | |
| 2012/0172763 A1* | 7/2012 | King | A61B 5/1071 600/595 |
| 2012/0313848 A1 | 12/2012 | Galor et al. | |
| 2013/0005434 A1 | 1/2013 | Takehiro | |
| 2014/0075548 A1 | 3/2014 | Sampathkumaran et al. | |
| 2014/0165012 A1 | 6/2014 | Shen et al. | |
| 2014/0224377 A1* | 8/2014 | Bonefas | A01D 43/073 141/1 |
| 2014/0285326 A1 | 9/2014 | Luna et al. | |
| 2014/0298672 A1 | 10/2014 | Straker et al. | |
| 2015/0095683 A1 | 4/2015 | Kitatani | |
| 2015/0169074 A1 | 6/2015 | Ataee et al. | |
| 2015/0227282 A1 | 8/2015 | Oh et al. | |
| 2015/0244719 A1 | 8/2015 | Sampathkumaran et al. | |
| 2015/0301606 A1 | 10/2015 | Andrei | |
| 2015/0335284 A1 | 11/2015 | Nuovo et al. | |
| 2015/0338880 A1 | 11/2015 | Sato | |
| 2015/0372810 A1 | 12/2015 | Miller et al. | |
| 2016/0035229 A1* | 2/2016 | Uchida | G09B 19/0038 434/247 |
| 2016/0062320 A1 | 3/2016 | Chung | |
| 2016/0291573 A1* | 10/2016 | Kameta | G05B 19/402 |
| 2017/0026195 A1 | 1/2017 | Pan | |
| 2017/0296115 A1* | 10/2017 | Mahfouz | A61B 5/4528 |
| 2017/0357292 A1* | 12/2017 | Cho | G06F 1/1656 |

FOREIGN PATENT DOCUMENTS

| | | |
|---|---|---|
| CN | 102323854 B | 10/2013 |
| CN | 103678968 A | 3/2014 |
| CN | 104932697 A | 9/2015 |
| CN | 105388996 A | 3/2016 |
| CN | 105446649 A | 3/2016 |
| EP | 2 368 326 A2 | 9/2011 |
| EP | 2368326 A2 | 9/2011 |
| EP | 2 540 360 A1 | 1/2013 |
| EP | 2 709 031 A1 | 3/2014 |
| EP | 2 821 881 A1 | 1/2015 |
| EP | 2 972 680 A2 | 1/2016 |
| JP | 2013-013479 A | 1/2013 |
| JP | 5325265 B2 | 10/2013 |
| JP | 2014-056576 A | 3/2014 |
| KR | 20100073743 A | 7/2010 |
| KR | 10-2012-0105678 A | 9/2012 |
| KR | 10-2014-0034088 A | 3/2014 |
| KR | 10-1565768 B1 | 11/2015 |
| KR | 10-2016-0025722 A | 3/2016 |
| TW | I325491 B | 6/2010 |
| TW | I490011 B | 7/2015 |
| TW | I512551 B | 12/2015 |
| TW | 201606573 A | 2/2016 |
| TW | 201711489 A | 3/2017 |
| WO | 2010/074468 A2 | 7/2010 |
| WO | 2013/128510 A1 | 9/2013 |
| WO | 2014/145978 A2 | 9/2014 |
| WO | 2015/160481 A | 10/2015 |
| WO | 2015/177649 A2 | 11/2015 |

OTHER PUBLICATIONS

Krueger, et al., "Advances and perspectives of mechanomyography",Revista Brasileira de Engenharia Biomédica, vol. 30, No. 4, Dec. 2014, pp. 384-401.

Shima, K. and Tsuji, T., "An MMG-based human-assisting manipulator using acceleration sensors", IEEE International Conference on Systems, Man and Cybernetics, Oct. 2009, pp. 2433-2438.

Youn, W., and Kim, J., "Feasibility of using an artificial neural network model to estimate the elbow flexion force from mechanomyography", Journal of Neuroscience Methods, vol. 194, Issue 2, Jan. 15, 2011, pp. 386-393.

Zeng, et al., "Hand-motion patterns recognition based on mechanomyographic signal analysis", International Conference on Future BioMedical Information Engineering FBIE, Dec. 2009, pp. 21-24.

TW Office Action dated Feb. 1, 2018 in application No. 106110423.

* cited by examiner

CONTROL DEVICE AND CONTROL METHOD

TECHNICAL FIELD

The technique relates to a control device and a control method.

BACKGROUND

Technology always comes from human nature, so human machine interfaces of electronic devices are continuously developed in order to provide an improved or more intuitive experience of using the electronic devices to users. Traditional punched cards were used in the past and gradually evolved into well-known keyboard/mouse or game controllers nowadays. Recently, touch panels, somatosensory input devices and brainwave controllers are created. Technical personnel are devoted to providing a simple and intuitive input method to users. Briefly speaking, human motion input is a new technique highly anticipated in the field of human machine interface.

Take gesture input devices as an example. In general, gesture input devices operate based on image recognition technologies. Because the background images are complicated and infrared cameras would be interfered by the sunlight having complicated wavelengths, gesture input devices or somatosensory input devices can not be utilized outdoors. Especially for wearable devices which are more intuitive and portable. Take Google glass as an example. Since human motion input interfaces can not be utilized in Google glass, it is necessary for Google glass to use voice-controlled methods as an input interface.

On the other hand, image recognition technologies rely on image capturing module for obtaining input information. Currently, in the methods of gesture recognition based on a built-in camera, the user's hand needs to stay within the range that the built-in camera could reach. In this condition, it results in controlling actions which are not smooth extremely. Moreover, even though wearable devices can be worn outdoors, the wearable devices can not be controlled under the sunlight because of the limitation of the present IR image recognition technology. The voice-controlled methods are ineffective outdoors because of background noises.

SUMMARY

A control device is disclosed according to one embodiment of the present disclosure. The control device has a main body, a sensing module and a processing module. The sensing module is located in the main body. The main body has a device reference axis defined. The processing module is coupled to the sensing module configured to detect angle information and strength information. The angle information is related to an angle between the device reference axis and a base reference axis. The strength information is related to a force applied to the main body. The processing module is configured to provide a control signal according to the angle information and the strength information.

A control method is disclosed according to one embodiment of the present disclosure. In the control method, first of all, angle information is obtained. The angle information is related to an angle between a device reference axis of a main body and a base reference axis. Strength information is obtained. The strength information is related to a force applied to the main body. Then, a control signal is provided according to the angle information and the strength information.

The foregoing and the following description of the embodiments are intended to illustrate and explain the spirit and principles of the invention, and to provide a further explanation of the scope of the application claims.

DETAILED DESCRIPTION OF EMBODIMENTS

In the following detailed description, for purposes of explanation, numerous specific details are set forth in order to provide a thorough understanding of the disclosed embodiments. According to the disclosure, however, that one or more embodiments may be practiced by those skilled in the art, and the skilled in the art could understand the related aspects and advantages of the invention in accordance with the disclosed contents, claims and figures. The following embodiments further describe in detail the aspects of the invention, which, however, are not intended to limit the disclosure.

Figure 1:
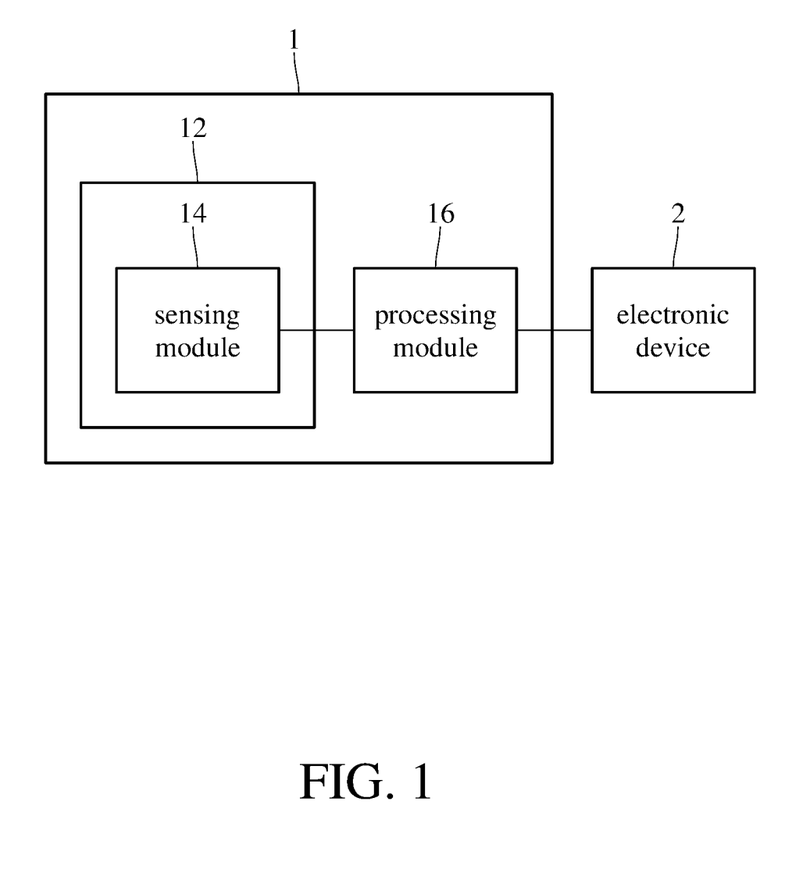
FIG. 1 is a block diagram of a control device according to one embodiment of the present disclosure.
Figure 2:
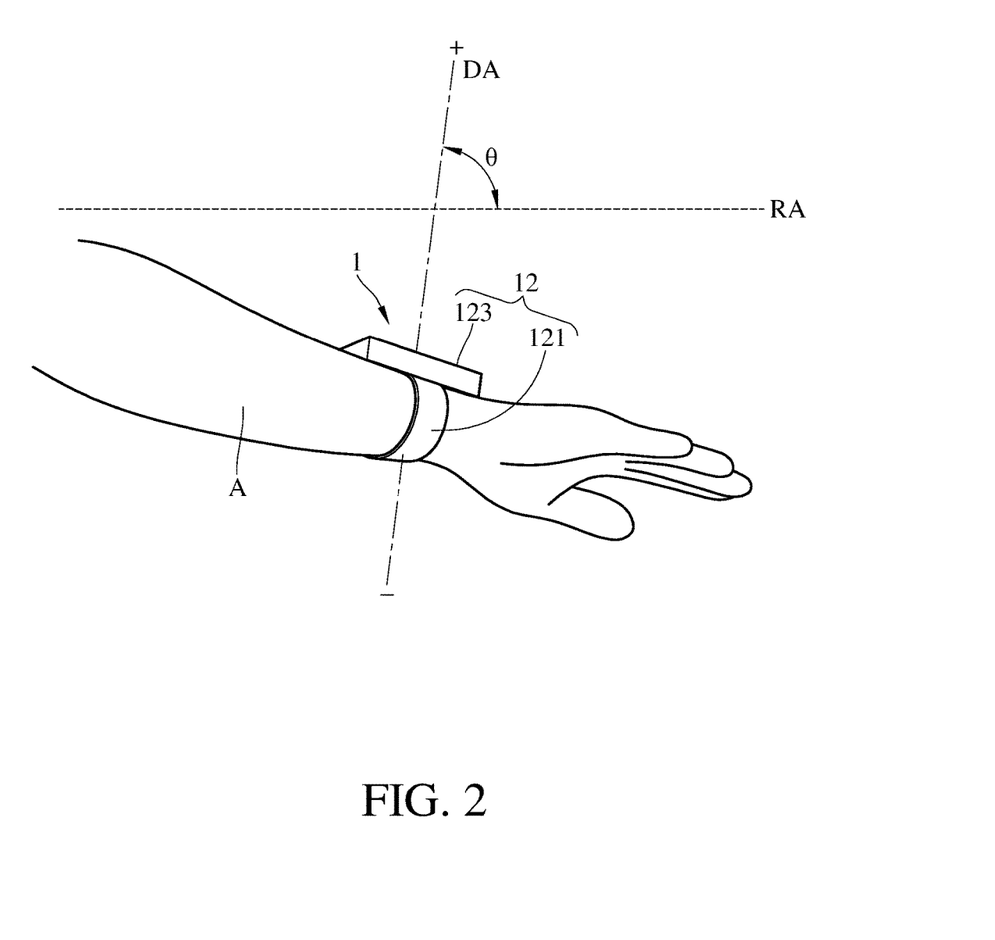
FIG. 2 is a schematic diagram of a control device according to one embodiment of the present disclosure.

Please refer to FIG. 1, which is a block diagram of a control device according to one embodiment of the present disclosure. As shown in the embodiment of FIG. 1, the control device 1 includes a main body 12, a sensing module 14 and a processing module 16. The sensing module 14 is located in the main body 12. The processing module 16 is coupled to the sensing module 14. The main body 12 has a device reference axis defined (as shown in FIG. 2). In one example, the processing module 16 communicates with an electronic device 2 in a wireless way or a wired way. The communication standard between the processing module 16 and the electronic device 2 is not limited in the present disclosure. In one example, the electronic device 2 is a computer, a laptop, a cell phone, a tablet, a television, a set of audio or other electronic device capable of communicating with the control device.

The sensing module 14 is configured to detect angle information and strength information. The angle information is related to an angle between the device reference axis and a base reference axis. The strength information is related to a force applied to the main body 12. Please refer to FIG. 2 for illustrating the angle information and the strength information. FIG. 2 is a schematic diagram of a control device according to one embodiment of the present disclosure. In the embodiment of FIG. 2, the main body 12 of the control device 1 is a wearable device including an accommodating unit 123 and a clamping unit 121, and the accommodating unit 123 is connected to the clamping unit 121. The clamping unit 121 is configured to removably fasten human limbs. In one example, the human limbs are arms, legs or bodies. In this example, the main body 12 is fastened at the arm A of the user through the clamping unit 121. However, the present disclosure is not limited to the above embodiment.

As shown in the embodiment of FIG. 2, the main body 12 has a device reference axis DA, and there is an angle θ between the device reference axis DA and the base reference axis RA. The value of the angle θ is changed with the orientation of the main body 12. More specifically, in one example, the base reference axis RA is the earth's axis, the geomagnetic axis, the horizontal axis or any reference axis. The device reference axis DA is an axis toward any direction and passing through any point of the main body 12. The direction of the device reference axis DA is not limited to the embodiment of FIG. 2. In other words, the angle information is related to the relative orientation of the main body 12 with respect to the base reference axis RA. Therefore, when the main body 12 is placed on the arm A of the user and the user moves the arm A, the main body 12 of the control device 1 is moved together with the arm A so that the angle θ changes. In practice, the device reference axis DA further has a positive terminal + and a negative terminal − for providing more information to define the value of the angle θ. In practice, there could be a medium between the main body 12 and the user's limb. In one example, the medium is foam, a fabric, an air bag or other kind of medium. However, the present disclosure is not limited to the above embodiment. In other words, the main body 12 touches the human limb directly or indirectly.

On the other hand, the strength information is related to a level or a characteristic of the force applied to the main body 12. The characteristic means the frequency of the force, the waveform of the force or the cycle of the force, etc. More specifically, in the embodiment of FIG. 2, the main body 12 touches the arm A of the user directly or indirectly, and when the user's palm acts, the muscles of the arm A stretch so that an external force is applied to the main body 12. Therefore, the sensing module 14 obtains the strength information corresponding to the external force applied to the main body 12. The above embodiment is just for illustrating and the present disclosure is not limited to the above embodiment.

In one embodiment, the sensing module 14 includes a gravitational acceleration sensor (G sensor) or a photo sensor. In the example that the sensing module 14 includes a gravitational acceleration sensor, the device reference axis DA is the detection axial of the gravitational acceleration sensor. When the user's arm A swings, the main body 12 accordingly moves so that the device reference axis DA moves as well. In this condition, the sensing module 14 obtains the angle information. When the user's palm acts, the muscles of the arm A stretch correspondingly so that the main body 12 shakes correspondingly. Therefore, the sensing module 14 obtains the strength information. When the user's arm A swings and the user's palm acts, the sensing module 14 is capable of obtaining the angle information and the strength information concurrently.

The processing module 16 is configured to provide a control signal according to the angle information and the strength information. In one example, the processing module 16 is a central processing unit (CPU), a micro control unit (MCU), an application-specific integrated circuit (ASIC) or a field-programmable gate array (FPGA). In one example, the processing module 16 is located in the main body 12. In another example, the processing module 16 is not located in the main body 12. Therefore, the processing module 16 communicates with the sensing module 14 in a wireless way or a wired way for obtaining the information detected by the sensing module 14. The above embodiments are just for illustrating and the present disclosure is not limited to the above embodiments. In the embodiment of FIG. 2, the processing module 16 is located in the main body 12 and the processing module 16 provides the control signal to the electronic device 2 in a wireless way for controlling the electronic device 2 according to the angle information and the strength information. In one embodiment, the processing module 16 proceeds an analysis of mechanomyogram (MMG) according to the acceleration signal, detected by the sensing module 14, for obtaining the angle information and the strength information. Therefore, not only information regarding the postures and the action frequency of the user can be obtained, but also various action strengths of the user can be recognized.

In one embodiment, the electronic device 2 is a computer, and the control signal provided by the processing module 16 is a keyboard event or a mouse event triggering the computer. More specifically, the control signal provided by the processing module 16 is a simulation of pressing button(s) of the keyboard, moving the mouse or pressing button(s) of the mouse. In another embodiment, the electronic device 2 is a touch panel, and the control signal provided by the processing module 16 is a touching event triggering the touch panel. More specifically, the control signal provided by the processing module 16 is configured to simulate a touching track on the touch panel or a clicking on the touch panel. The above embodiments are just for illustrating and the present disclosure is not limited to the above embodiments.

Figure 3:
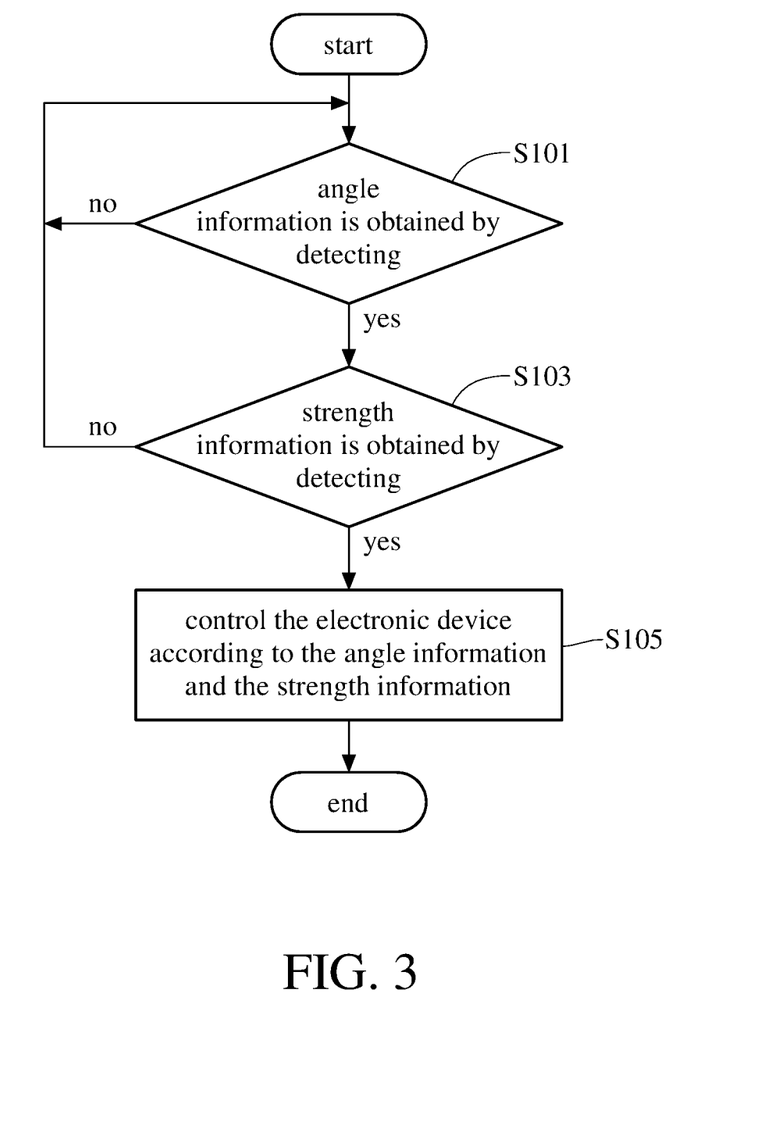
FIG. 3 is a flow chart of a controlling method according to one embodiment of the present disclosure.

Please refer to FIG. 3 for illustrating a method that is used by the control device 1 to control an electronic device according to the angle information and the strength information. FIG. 3 is a flow chart of a control method according to one embodiment of the present disclosure. As shown in the embodiment of FIG. 3, in step S101, the angle information is obtained by detecting. Perform step S101 again if the angle information is not obtained. If the angle information is obtained, the strength information is obtained by detecting in step S103. When the strength information is not obtained, perform step S101. After obtaining the strength information, in step S105, control the electronic device according to the angle information and the strength information. In practice, step S101 and step S103 are interchangeable. In another example, step S101 and step S103 are performed concurrently. The relative detailed operations are designed by persons of ordinary skill in the art according to actual demands, so not limited here.

Figure 4:
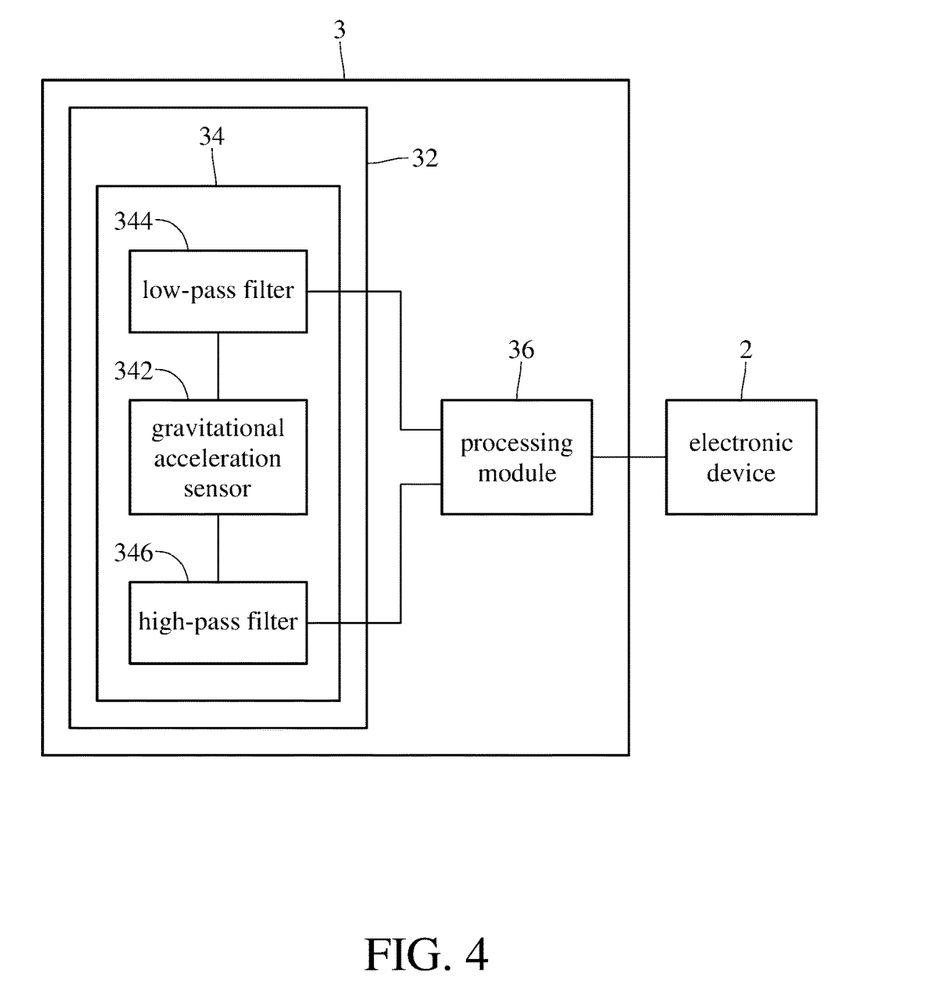
FIG. 4 is a block diagram of the control device according to another embodiment of the present disclosure.

Please refer to FIG. 2 and FIG. 4 for illustrating the embodiments and the operations of the control device. FIG. 4 is a block diagram of the control device 3 according to another embodiment of the present disclosure. In the embodiment of FIG. 4, the sensing module 34 further includes a gravitational acceleration sensor 342, a low-pass filter 344 and a high-pass filter 346. The gravitational acceleration sensor 342 is coupled to the low-pass filter 344 and the high-pass filter 346. The low-pass filter 344 and the high-pass filter 346 are respectively coupled to the processing module 36. The frequency responses and the structures of the low-pass filter 344 and the high-pass filter 346 are not limited in the present disclosure.

In the embodiment of FIG. 4, the aforementioned device reference axis DA is a detection axis of the gravitational acceleration sensor 342. In one example, the gravitational acceleration sensor 342 has one or more components of microelectromechanical systems (MEMS), and is configured to generate a detection signal according to the displacement and position of the main body 32. The low-pass filter 344 is configured to generate a low-frequency signal according to the low-frequency section of the detection signal of the gravitational acceleration sensor 342. The low-frequency signal has the angle information mentioned above. The high-pass filter 346 is configured to generate a high-frequency signal according to the high-frequency section of the detection signal of the gravitational acceleration sensor 342. The high-frequency signal has the strength information mentioned above.

In one embodiment, the angle information has an acceleration value and the strength information has a strength value. The processing module 36 obtains the acceleration value according to the low-frequency signal. The processing module 36 obtains the strength value according to the high-frequency signal. The processing module 36 provides the control signal according to the acceleration value and the strength value. In practice, the acceleration value is a component value or a vector value of gravitational acceleration caused by the gravity of the earth, which corresponds to the device reference axis DA. In one example, the strength value is a value of an external force applied to the main body by stretching the muscles of the arm A. In this embodiment, the voltage value and the current value of the low-frequency signal correspond to the orientation of the main body 12. Therefore, the voltage value or the current value of the low-frequency signal could be converted to an acceleration value. From another point of view, different acceleration values respectively correspond to different angles θ. The strength value is a root mean square (RMS), an average of absolute values, a zero-crossing value, a differential value, a median frequency or a highest frequency of energy of the high-frequency signal. The above embodiments are just for illustrating. The present disclosure is not limited to the above embodiments.

Continuously refer to the aforementioned embedment, when the processing module 36 determines the acceleration value is within one of a plurality of first enabling ranges and the strength value is within one of a plurality of second enabling ranges, the processing module 36 provides the control signal according to the first enabling range where the acceleration value is.

Figure 5:
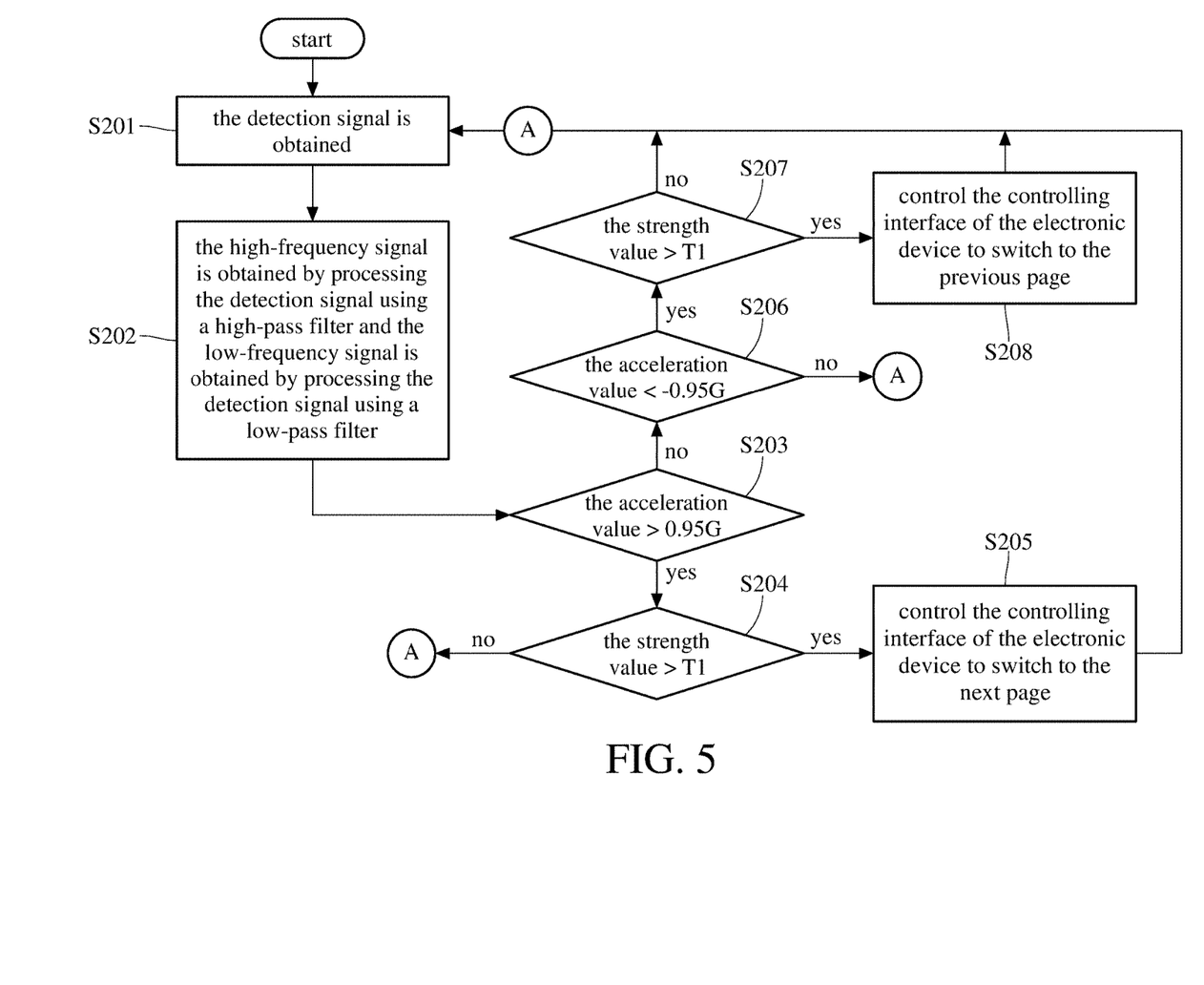
FIG. 5 is a flow chart of a method for controlling the electronic device according to one embodiment of the present disclosure.

Please refer to FIG. 5 for illustrating how the electronic device is controlled according to the angle information and the strength information. FIG. 5 is a flow chart of a method for controlling the electronic device according to one embodiment of the present disclosure. In the embodiment of FIG. 5, the angle information and the strength information are used for determining whether the user would like to control the controlling interface of the electronic device to switch to the previous page or the next page.

In step S201, the detection signal is obtained. In step S202, the high-frequency signal is obtained by processing the detection signal using a high-pass filter and the low-frequency signal is obtained by processing the detection signal using a low-pass filter. The acceleration value and the strength value are obtained as mentioned above. In step S203, determine whether the acceleration value is greater than a first threshold. In this embodiment, the first threshold is 0.95 G in an example, wherein G represents the gravitational acceleration and the unit of G is meter per second squared (m/s2). For example, in the earth, 1 G=9.8 m/s2. When the acceleration value is greater than a first threshold, in step S204, determine whether the strength value is greater than a strength threshold T1. When the strength value is greater than the strength threshold T1, control the controlling interface of the electronic device to switch to the next page in step S205. After step S205 is performed, perform step A, which is the equivalent of returning to step S201. When it is determined that the strength value is not greater than the strength threshold T1 in step S207, perform step A, which is the equivalent of returning to step S201.

Please refer to the embodiment of FIG. 2, the condition that the acceleration value is greater than 0.95 G, equivalently indicates that the user holds the arm A approximately horizontal with the palm down. In other words, the angle θ is around 0 degree. Moreover, the condition that the strength value is greater than the strength threshold T1, equivalently indicates that a significant action of the user's hand happens. For example, when the user swings the palm, the muscles of the arm A are stretched. Therefore, the external force applied to the main body is greater than the strength threshold. Thus, in this embodiment, when the acceleration value is greater than 0.95 G and the strength value is greater than the strength threshold T1, the processing module 36 determines that the user consciously swings the palm with the palm down. Therefore, the processing module 36 controls the controlling interface of the electronic device to be switched to the next page according to a predetermined relationship such as a lookup table.

On the other hand, in this embodiment, when it is determined that the acceleration value is not greater than 0.95 G, determine whether the acceleration value is less than a second threshold in step S206. In this embodiment, the second threshold is -0.95 G. As mentioned above, G is configured to represent the gravitational acceleration caused by the gravity of the earth. When it is determined that the acceleration value is not less than -0.95 G, perform step A, which is the equivalent of returning to step S201. When it is determined that the acceleration value is less than -0.95 G, determine whether the strength value is greater than the strength threshold T1 in step S207. When it is determined that the strength value is greater than the strength threshold T1, control the controlling interface of the electronic device to switch to the previous page in step S208. When it is determined that the strength value is not greater than the strength threshold T in step S207 or the performance of step S208 is finished, perform step A, which is the equivalent of returning to step S201.

Please refer to the embodiment of FIG. 2 continuously, the condition that the acceleration value is less than -0.95 G, equivalently indicates that the user holds the arm A approximately horizontal with the palm down. In other words, the angle θ is around 0 degree. Moreover, as mentioned above, the condition that the strength value is greater than the strength threshold T1 equivalently indicates that a significant action of the user's hand happens. For example, the user swings the palm. Therefore, in this embodiment, when the acceleration value is less than -0.95 G and the strength value is greater than the strength threshold T1, the processing module 36 determines that the user consciously swings the palm with the palm up. Therefore, the processing module 36 controls the controlling interface of the electronic device to switch to the previous page according to a predetermined relationship such as a lookup table.

In the embodiment of FIG. 5, the first enabling range is below −0.95 G and above 0.95 G. As mentioned above, the processing module controls the electronic device to operate differently according to the acceleration below the range of −0.95 G or above the range of 0.95 G. In fact, the definition of the first enabling range is not limited in the above embodiment. Please further refer to illustrations as follow.

Figure 6:
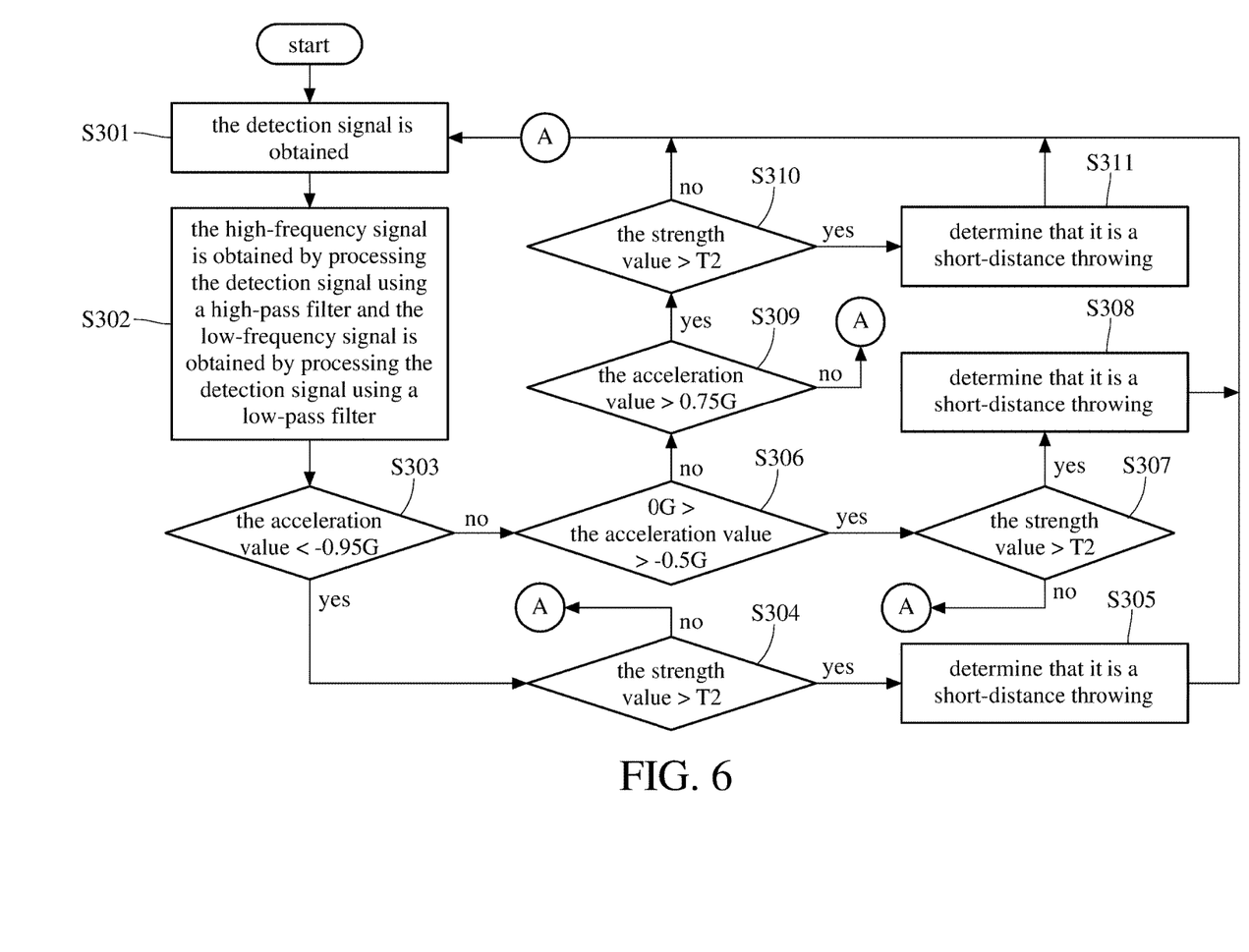
FIG. 6 is a flow chart of a method for controlling the electronic device according to another embodiment of the present disclosure.

Please refer to FIG. 6 for illustrating a method for controlling the electronic device. FIG. 6 is a flow chart of method for controlling the electronic device according to another embodiment of the present disclosure. In the embodiment of FIG. 6, the angle information and the strength information are used for determining that the user would like to perform a short-distance throwing, a medium-distance throwing or a long-distance throwing, in order to correspondingly control the electronic device to execute relative commands, for example, a human figure in the program is controlled to throw a ball in a corresponding way. However, the present disclosure is not limited to the above embodiment.

In step S301, the detection signal is obtained. In step S302, the high-frequency signal is obtained by processing the detection signal using a high-pass filter and the low-frequency signal is obtained by processing the detection signal using a low-pass filter. The acceleration value and the strength value are obtained as mentioned above. Then, in step S303, determine whether the acceleration value is less than a third threshold. In this embodiment, the third threshold is −0.95 G. The relative detained information is same as mentioned above, so no more repeat here. When it is determined that the acceleration value is less than −0.95 G, determine whether the strength value is greater than the strength threshold T2. When it is determined that the strength value is greater than the strength threshold T2 in step S304, determine the action of the user is similar to a short-distance throwing and correspondingly control the electronic device to execute relative commands in step S305. When it is determined that the strength value is not greater than the strength threshold T2 in step S305, perform step A, which is the equivalent of returning to step S301.

When it is determined that the acceleration value is not less than −0.95 G in step S303, perform step S306 to determine whether the acceleration value is less than 0 G and greater than −0.5 G. Perform step S307 to determine whether the strength value is greater than the strength threshold T2 when the condition that the acceleration value is less than 0 G and greater than −0.5 G is satisfied. When it is determined that strength value is greater than the strength threshold T2 in step S307, determine that the action of the user is similar to a medium-distance throwing, and then correspondingly control the electronic device. When it is determined that strength value is not greater than the strength threshold T2 in step S307, perform step A, which is the equivalent of returning to step S301.

When the condition that the acceleration value is less than 0 G and greater than −0.5 G is not satisfied, perform step S309 to determine whether the acceleration value is greater than 0.75 G. When the acceleration value is greater than 0.75 G, perform step S310 to determine whether the strength value is greater than the strength threshold T2. When it is determined that the strength value is greater than the strength threshold T2 in step S310, determine that the action of user is similar to a long-distance throwing and correspondingly control the electronic device. When it is determined that the strength value is not greater than the strength threshold T2 in step S310, perform step A, which is the equivalent of returning to step S301. When one of step S305, step S308 or step S311 is completed, perform step A, which is the equivalent of returning to step S301.

In this embodiment, when the acceleration value is less than −0.95 G, the user holds the arm A approximately horizontal with the palm up. In other words, the angle θ is around 0 degree. In this condition, only the user's palm acts. Therefore, it is determined that the user performs a short-distance throwing and the electronic device 2 is correspondingly controlled to execute a command related to the short-distance throwing. When the acceleration value is less than 0 G and greater than −0.5 G, the user's palm faces up and the user's wrist slightly moves forward and upward. Therefore, it is determined that the user performs a medium-distance throwing and the electronic device is correspondingly controlled to execute a command related to the medium-distance throwing. When the acceleration value is greater than 0.75 G, the user lifts an object and throws the object by moving the arm from the top to bottom and from rear to front. Therefore, it is determined that the user performs a medium-distance throwing and the electronic device is correspondingly controlled to execute a command related to the long-distance throwing.

Therefore, in the embodiment of FIG. 6, the first enabling range has three sub-ranges, and the processing module controls the electronic device respectively according to the sub-range where the acceleration is. The critical range corresponding to each of the first enabling ranges are just for illustrating. In fact, the definition of the first enabling range is not limited to the above embodiment.

Figure 7A:
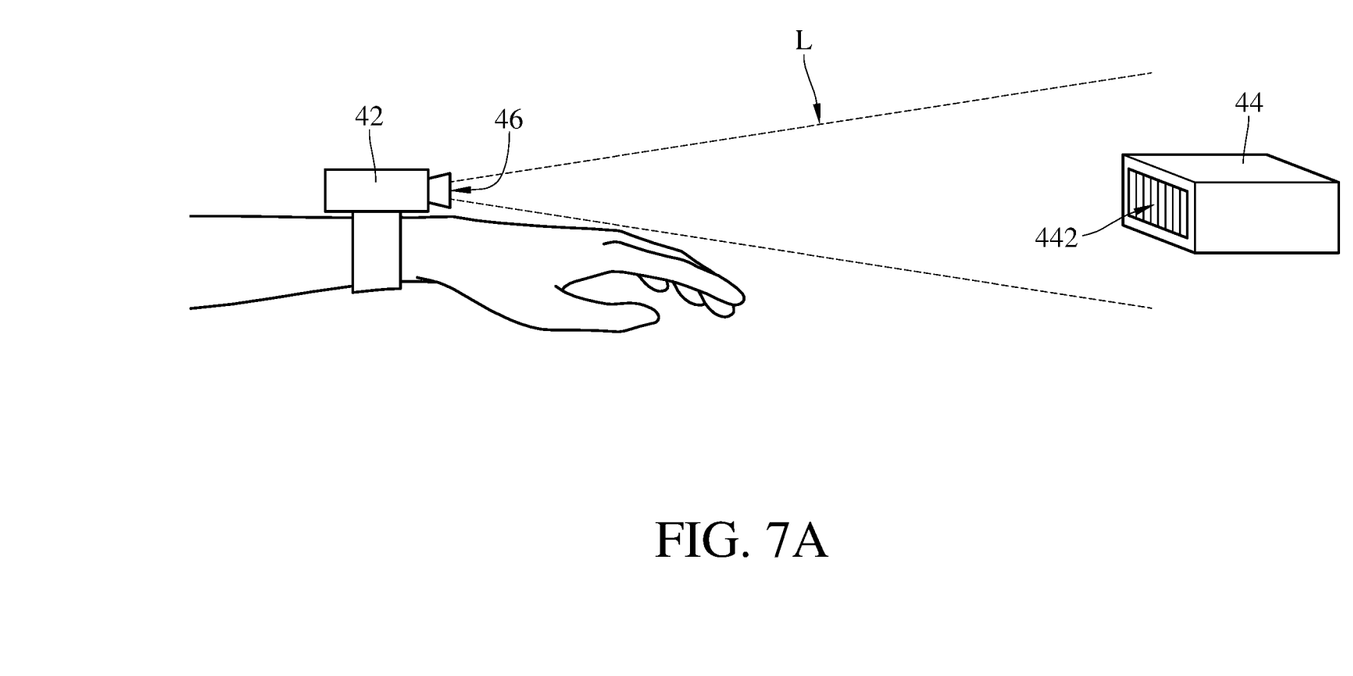
FIG. 7A is a schematic diagram of a control device according to another embodiment of the present disclosure.
Figure 7B:
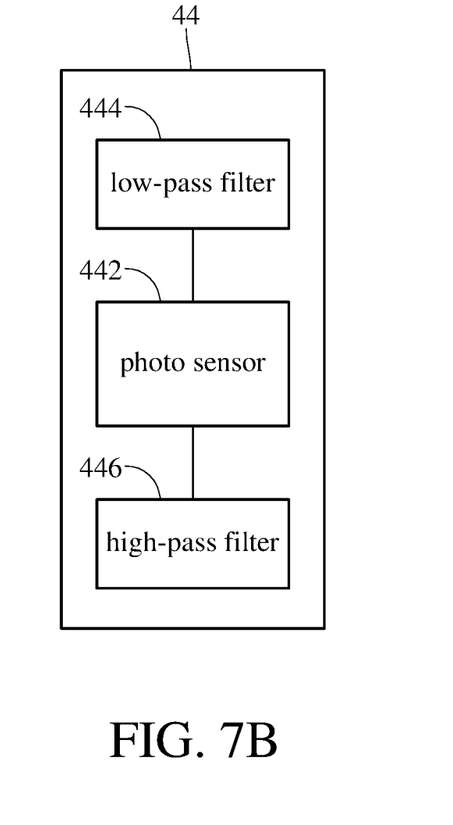
FIG. 7B is a block diagram of the sensing module according to another embodiment of the present disclosure.
Figure 8A:
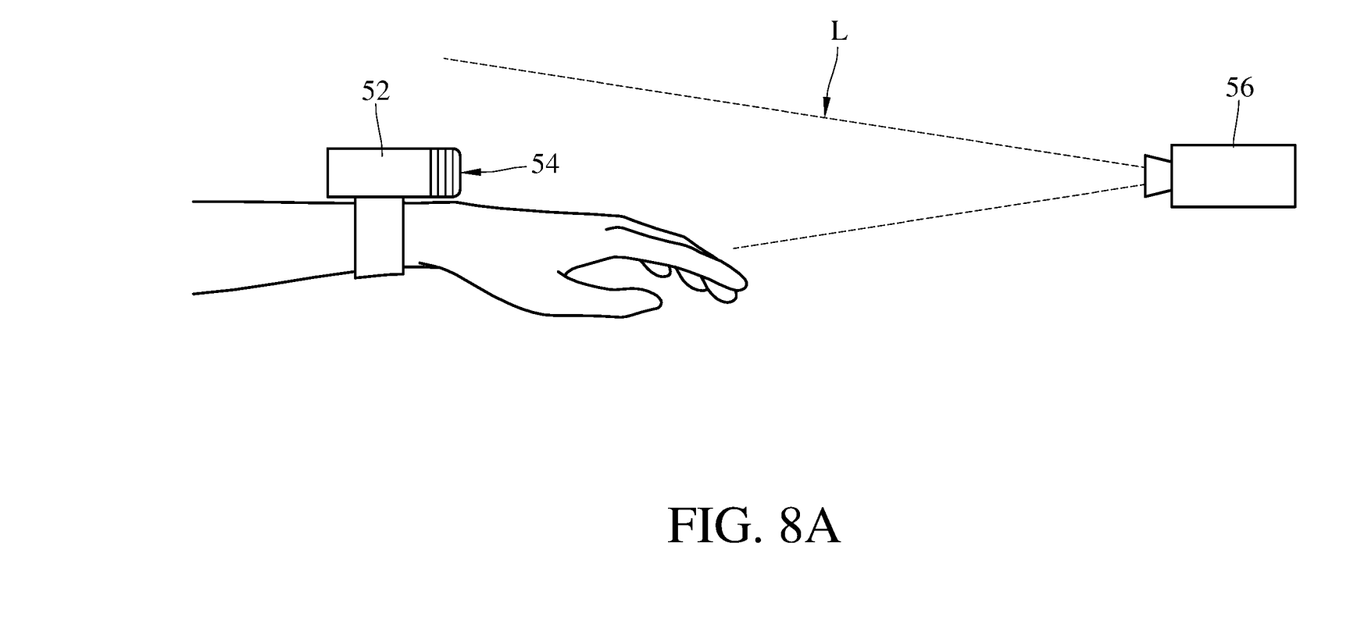
FIG. 8A is a schematic diagram of the control device according to another embodiment of the present disclosure.
Figure 8B:
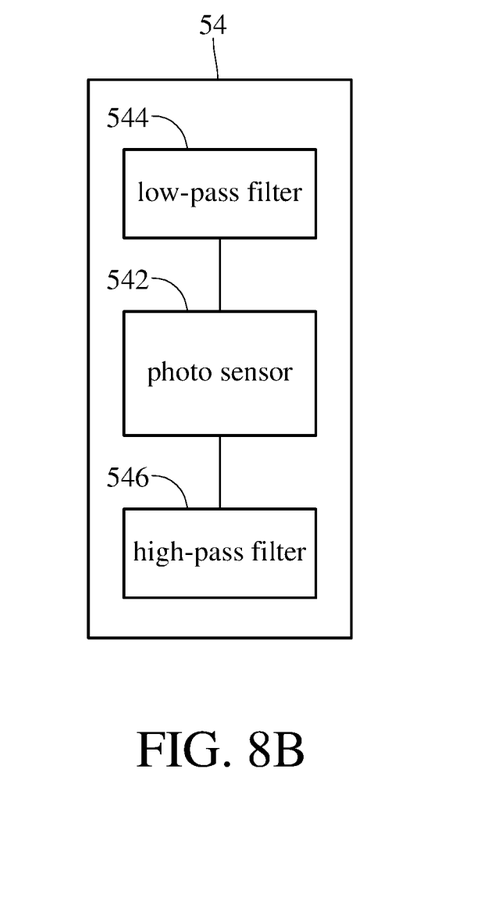
FIG. 8B is a block diagram of the sensing module according to another embodiment of the present disclosure.

Please refer to FIG. 7A, FIG. 7B, FIG. 8A and FIG. 8B. FIG. 7A is a schematic diagram of a control device according to another embodiment of the present disclosure. FIG. 7B is a block diagram of a sensing module according to another embodiment of the present disclosure. FIG. 8A is a schematic diagram of the control device according to another embodiment of the present disclosure. FIG. 8B is a block diagram of a sensing module according to another embodiment of the present disclosure. FIG. 7A to FIG. 8B illustrate the embodiments of detections utilizing optics.

In the embodiment of FIG. 7A and FIG. 7B, the control device further includes a light-emitting module 46. The light-emitting module 46 is located in the main body 42. The light-emitting module 46 is configured to provide an optical signal L. The frequency and the form of the optical signal L are not limited in the present disclosure. Moreover, the sensing module 44 includes a photo sensor 442, a low-pass filter 444 and a high-pass filter 446. The low-pass filter 444 and the high-pass filter 446 are respectively coupled to the photo sensor 442.

The photo sensor 442 is configured to receive the optical signal and generate a detection signal according to the direction and the intensity of the optical signal L received. The low-pass filter 444 is configured to generate a low-frequency signal according to a low-frequency section of the detection signal. The low-frequency signal has angle information. The high-pass filter 446 is configured to generate a high-frequency signal according to a high-frequency section of the detection signal. The high-frequency signal has strength information. In other words, when the arm is moved, the main body 42 is moved relatively so that the direction and the intensity of the light are affected. Therefore, the low-frequency section of the detection signal is affected. When an action of the palm happens, the muscles of the arm correspondingly are stretched so that the direction and the intensity of the light received are affected. Therefore, the high-frequency section of the detection signal is affected.

In the embodiment of FIG. 8A and FIG. 8B, the control device further includes a light-emitting module 56. The sensing module 54 is located in the main body 52. The light-emitting module 56 is configured to provide an optical signal L. The frequency of the optical signal L is not limited in the present disclosure. Moreover, the sensing module 54 includes a photo sensor 542, a low-pass filter 544 and a high-pass filter 546. The low-pass filter 544 and the high-pass filter 546 are respectively coupled to the photo sensor 542.

The photo sensor 542 is configured to receive the optical signal L and generates a detection signal according to the direction and the strength of the optical signal L received. The low-pass filter 544 is configured to generate a low-frequency signal according to a low-frequency section of the detection signal. The low-frequency signal has angle information. The high-pass filter 546 is configured to generate a high-frequency signal according to a high-frequency section of the detection signal. The high-frequency signal has strength information. In other words, when the arm is moved, the main body 52 is moved relatively so that the direction and the intensity of the light received are affected. Therefore, the low-frequency section of the detection signal is affected. When an action of the palm happens, the muscles of the arm correspondingly are stretched so that the direction and the intensity of the light received are affected. Therefore, the high-frequency section of the detection signal is affected.

According to the above descriptions, a control method is disclosed in the present disclosure. In the control method, the angle information and the strength information are obtained. The angle information is related to the angle between the device reference axis of the main body of the control device and the base reference axis. The strength information is related to a force applied to the main body. Moreover, the control signal is provided according to the angle information and the strength information.

Based on the above descriptions, a control device and a control method are provided in the embodiments of the present disclosure. In the operation of the control device, the control device controls the electronic device according to the angle information and the strength information. This way of detection may not be interfered by the environment. Moreover, by recognizing information indicated by a different frequency band of the detected signal, the control device is capable of correspondingly performing a determination regarding an input mode so that the electronic device could be accurately controlled to perform a variety of operations. Thereby, the problems that video recognition cannot be utilized on a variety of environments are avoided. Moreover, the users are able to intuitively control electronic devices through human actions accurately and variously. For the above descriptions, the present disclosure may be quite innovative.

Although the invention has been described above with reference to aforementioned embodiments, which, however, are not intended to limit the invention. Various changes and modifications that be made therein without departing from the spirit and scope of the invention are within the invention claimed scope. Accordingly, the scope of protection of the invention is defined by the appended claims.

What is claimed is:

1. A control device, comprising:
   a main body having a device reference axis defined;
   a sensing module located in the main body and configured to detect angle information related to an angle between the device reference axis and a base reference axis, and strength information related to a force applied to the main body, wherein the sensing module comprises:
   a gravitational acceleration sensor configured to generate a detection signal according to the angle between the device reference axis and the base reference axis and the force;
   a low-pass filter configured to generate a low-frequency signal having the angle information according to a low-frequency section of the detection signal; and
   a high-pass filter configured to generate a high-frequency signal having the strength information according to a high-frequency section of the detection signal; and
   a processing module located in the main body and configured to provide a control signal according to the angle information and the strength information;
   wherein the angle information comprises an acceleration value, the strength information comprises a strength value, the processing module obtains the acceleration value according to the low-frequency signal and obtains the strength value according to the high-frequency signal, and the processing module provides the control signal according to the acceleration value and the strength value,
   wherein when the processing module determines that the acceleration value is within one of a plurality of first enabling ranges and the strength value is within one of a plurality of second enabling ranges, the processing module provides the control signal according to the first enabling range where the acceleration value is.

2. The control device according to claim 1, wherein the strength value is a root mean square value of the high-frequency signal.

3. A control device, comprising:
   a main body having a device reference axis defined;
   a sensing module configured to detect angle information related to an angle between the device reference axis and a base reference axis, and strength information related to a force applied to the main body;
   a processing module configured to provide a control signal according to the angle information and the strength information; and
   a light-emitting module located in the main body and configured to provide an optical signal;
   wherein the sensing module comprises:
   a photo sensor configured to receive the optical signal and generate a detection signal according to a direction and a strength of the optical signal received;
   a low-pass filter configured to generate a low-frequency signal having the angle information according to a low-frequency section of the detection signal; and
   a high-pass filter configured to generate a high-frequency signal having the strength information according to a high-frequency section of the detection signal.

4. The control device according to claim 3, wherein the angle information comprises an acceleration value, the strength information comprises a strength value, the processing module obtains the acceleration value according to the low-frequency signal and obtains the strength value according to the high-frequency signal, and the processing module provides the control signal according to the acceleration value and the strength value.

5. The control device according to claim 4, wherein when the processing module determines that the acceleration value is within one of a plurality of first enabling ranges and the strength value is within one of a plurality of second enabling ranges, the processing module provides the control signal according to one of the plurality of first enabling ranges where the acceleration value is.

6. The control device according to claim 4, wherein the strength value is a root mean square value of the high-frequency signal.

7. A control device, comprising:
a main body having a device reference axis defined;
a sensing module configured to detect angle information related to an angle between the device reference axis and a base reference axis, and strength information related to a force applied to the main body;
a processing module configured to provide a control signal according to the angle information and the strength information; and
a light-emitting module configured to provide an optical signal;
wherein the sensing module is located in the main body and comprises:
a photo sensor configured to receive the optical signal and generate a detection signal according to a direction and a strength corresponding to the optical signal received;
a low-pass filter configured to generate a low-frequency signal having the angle information according to a low-frequency section of the detection signal; and
a high-pass filter configured to generate a high-frequency signal having the strength information according to a high-frequency section of the detection signal.

8. The control device according to claim 7, wherein the angle information comprises an acceleration value, the strength information comprises a strength value, the processing module obtains the acceleration value according to the low-frequency signal, the processing module obtains the strength value according to the high-frequency signal, and the processing module provides the control signal according to the acceleration value and the strength value.

9. The control device according to claim 8, wherein when the processing module determines that the acceleration value is within one of a plurality of first enabling ranges and the strength value is within one of a plurality of second enabling ranges, the processing module provides the control signal according to the first enabling range where the acceleration value is.

10. The control device according to claim 8, wherein the strength value is a root mean square value of the high-frequency signal.

11. A control method, comprising:
obtaining angle information related to an angle between a device reference axis of a main body of a control device and a base reference axis;
obtaining strength information related to a force applied to the main body;
providing a control signal according to the angle information and the strength information;
obtaining a detection signal through a gravitational acceleration sensor;
generating a low-frequency signal having the angle information according to a low-frequency section of the detection signal;
generating a high-frequency signal having the strength information according to a high-frequency section of the detection signal; wherein the angle information comprises an acceleration value, the strength information comprises a strength value,
obtaining the acceleration value according to the low-frequency signal;
obtaining the strength value according to the high-frequency signal;
providing the control signal according to the acceleration value and the strength value;
determining whether the acceleration value is within one of a plurality of first enabling ranges;
determining whether the strength value is within one of a plurality of second enabling ranges; and
when it is determined that the acceleration value is within one of the plurality of first enabling ranges and the strength value is within one of the plurality of first second enabling ranges, providing the control signal according to the first enabling range where the acceleration value is.

12. The control method according to claim 11, wherein the strength value is a root mean square value of the high-frequency signal.

* * * * *